(12) United States Patent
Takla et al.

(10) Patent No.: US 11,700,194 B1
(45) Date of Patent: Jul. 11, 2023

(54) SYSTEMS AND METHODS FOR SYNCHRONIZING NETWORK SIMULATION FOR REPEATABILITY BASED ON A UNIVERSAL TIME CLOCK

(71) Applicant: Verizon Patent and Licensing Inc., Basking Ridge, NJ (US)

(72) Inventors: Mourad B. Takla, Hillsborough, NJ (US); Xiong Yang, Berkeley Heights, NJ (US); Sankrith Subramanian, St. Petersburg, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/808,002

(22) Filed: Jun. 21, 2022

(51) Int. Cl.
  *H04L 43/50* (2022.01)
  *H04L 43/0817* (2022.01)
  *H04L 43/067* (2022.01)
  *H04L 43/106* (2022.01)

(52) U.S. Cl.
  CPC ............ *H04L 43/50* (2013.01); *H04L 43/067* (2013.01); *H04L 43/0817* (2013.01); *H04L 43/106* (2013.01)

(58) Field of Classification Search
  CPC ... H04L 43/50; H04L 43/067; H04L 43/0817; H04L 43/106; H04L 69/28; H04L 41/145; H04W 16/22
  See application file for complete search history.

(56) References Cited

U.S. PATENT DOCUMENTS

| | | | |
|---|---|---|---|
| 11,502,913 B1 * | 11/2022 | Kamen | H04L 41/145 |
| 2019/0005167 A1 * | 1/2019 | Laemmle | G06F 9/54 |

FOREIGN PATENT DOCUMENTS

WO WO-2018113932 A1 * 6/2018 ............ H04L 41/145

* cited by examiner

*Primary Examiner* — Glenton B Burgess
*Assistant Examiner* — Rachel J Hackenberg

(57) ABSTRACT

A device may receive a simulation start command and status data indicating that network elements are ready to process data for multiple simulations. The device may align a time slot to zero, and may define a simulation start time, for the multiple simulations, based on the simulation start command and the status data. The device may define a verification start time, for the multiple simulations, based on the simulation start command, the status data, the time slot, and a system frame number being zero, and may define a network frame number that increments when the verification start time changes from zero to one. The device may cause the multiple simulations to be executed by the network elements, based on the time slot, the system frame number, and the network frame number, and may receive synchronized simulation results based on causing the multiple simulations to be executed by the network elements.

20 Claims, 13 Drawing Sheets

SYSTEMS AND METHODS FOR SYNCHRONIZING NETWORK SIMULATION FOR REPEATABILITY BASED ON A UNIVERSAL TIME CLOCK

BACKGROUND

Wireless network simulation may require repeatability of a simulation. A simulation system may utilize a single universal time clock (UTC) to synchronize various network elements during a simulation. However, since a simulation start time is not controlled by the UTC, synchronization of repeated simulations and comparison of simulation results becomes almost impossible.

DETAILED DESCRIPTION OF EXAMPLE EMBODIMENTS

Figure 1A:
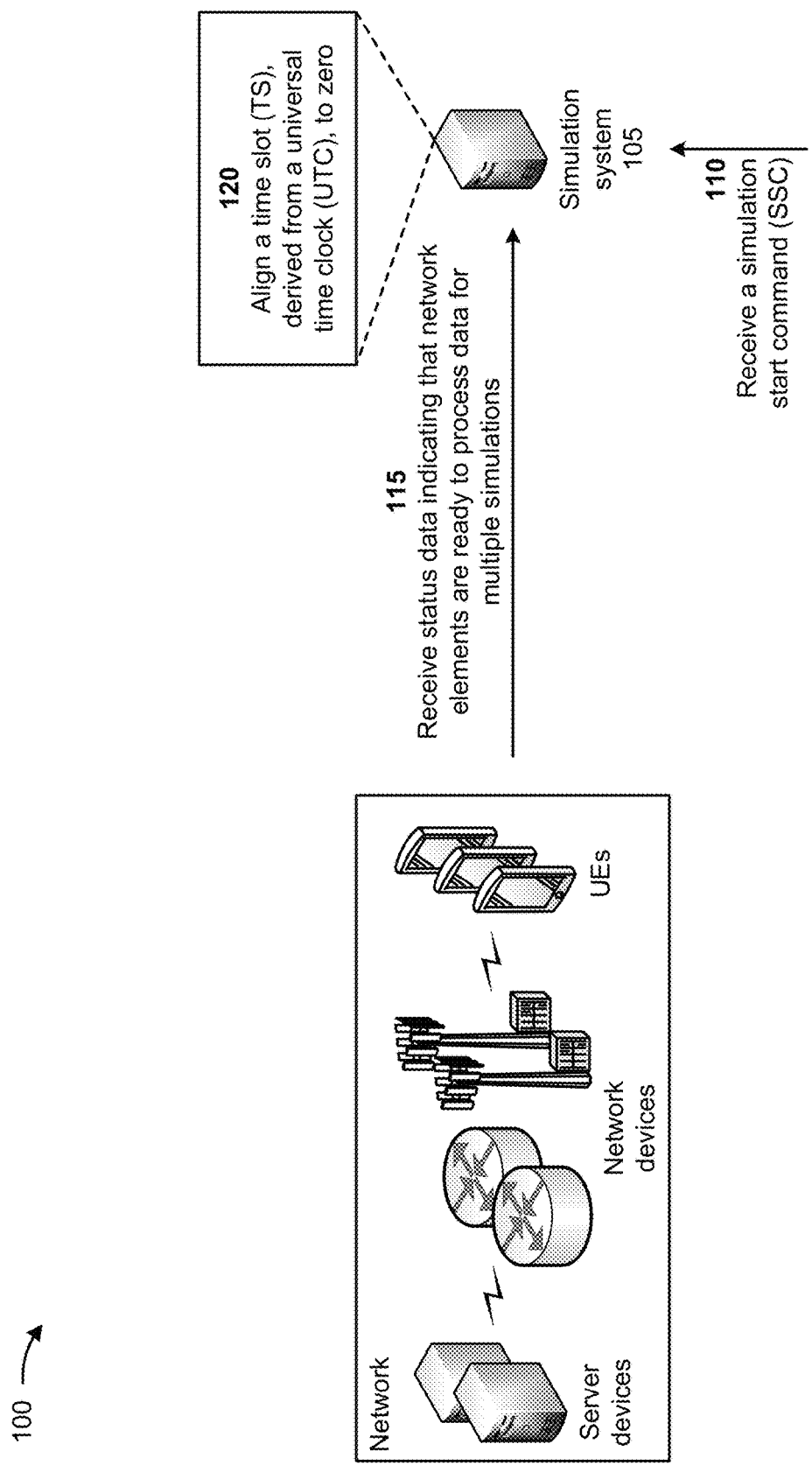
FIGS. 1A-1J are diagrams of an example associated with synchronizing network simulation for repeatability based on a UTC.

The following detailed description of example implementations refers to the accompanying drawings. The same reference numbers in different drawings may identify the same or similar elements.

A precision time protocol (PTP) may be utilized to synchronize multiple network elements (e.g., server devices, network devices, user equipment (UE), and/or the like) in a wireless network (e.g., a telecommunications network). A simulation may utilize a PTP stack that extracts the UTC for execution of network functions. A protocol stack may define a system frame number (SFN) and a time slot (TS), which are derived from the UTC. The SFN may include a value from 0 to 1023 and a duration of ten (10) milliseconds (msec). The TS may include a value from 0 to 159, depending on a sub-carrier spacing. A single SFN may include a variable number of time slots (e.g., 10, 20, 40, 80, 160, and/or the like) depending on the sub-carrier spacing (e.g., 15, 30, 60, 120, 240, and/or the like, kilohertz).

Starting a simulation that uses stacks may occur at any time and may start at any SFN and TS pair. For example, a first execution of a simulation may begin at a first SFN/TS pair (e.g., SFN1 and TS1), and a second execution of the simulation may begin at a second SFN/TS pair (e.g., SFN2 and TS2) that is different than the first SFN/TS pair. This makes comparing results of the first execution of the simulation and the second execution of the simulation extremely difficult. In addition, each network element may vary in a time required to be ready for different executions of the simulation, which adds more variability to the simulation results.

Thus, current techniques for repeatedly executing a simulation and comparing the results consume computing resources (e.g., processing resources, memory resources, communication resources, and/or the like), networking resources, and/or other resources associated with executing the simulation multiple times and generating incomparable simulation results, attempting and failing to compare results of executing the simulation multiple times, re-executing the simulation multiple times based on failing to compare the results of executing the simulation multiple times, and/or the like.

Some implementations described herein provide a simulation system that synchronizes network simulation for repeatability based on the UTC. For example, the simulation system may receive a simulation start command, and may receive status data indicating that network elements are ready to process data for multiple simulations. The simulation system may align the time slot, derived from the UTC, to be zero by waiting for the time slot to equal zero, and may define a simulation start time, for the multiple simulations, based on the simulation start command and the status data of various components representing the simulation elements. The simulation system may define a verification start time, for the multiple simulations, based on the simulation start command, the status data, the time slot being aligned to zero, and a system frame number, derived from the UTC, being zero. The simulation system may reset a network frame number to zero and may increment the network frame number when the verification start time changes from zero to one and after the simulation start time and the system frame number are equal to zero. The simulation system may cause the multiple simulations to be executed by the network elements, synchronized in time and based on the time slot, the system frame number, and the network frame number, and may receive synchronized simulation results based on causing the multiple simulations to be executed by the network elements. In some implementations, since the SFN is driven by the UTC, the simulation system may determine an instant when SFN=0 after a simulation start command (SSC) has been issued. In such implementations, a verification start time (VST)=0 when the SSC has been issued, status data is received from all the network elements, a simulation start time (SST)=0, and SFN=0.

In this way, the simulation system synchronizes network simulation for repeatability based on a UTC. For example, the simulation system may ensure synchronization of multiple simultaneous or continuous executions of a simulation regardless of when the simulation begins. This may result in the same events occurring at exactly the same relative time in every instance of the simulation being executed. Thus, the simulation system may conserve computing resources, networking resources, and/or other resources that would have otherwise been consumed by executing the simulation multiple times and generating incomparable simulation results, attempting and failing to compare results of executing the simulation multiple times, re-executing the simulation multiple times based on failing to compare the results of executing the simulation multiple times, and/or the like.

FIGS. 1A-1J are diagrams of an example 100 associated with synchronizing network simulation for repeatability based on a UTC. As shown in FIGS. 1A-1J, example 100 includes a network associated with a simulation system 105. The network may include one or more server devices, one or more network devices, one or more UEs, and/or the like (e.g., referred to herein as "network elements"). Further details of the simulation system 105, the server devices, the network devices, and the UEs are provided elsewhere herein.

As shown in FIG. 1A, and by reference number 110, the simulation system 105 may receive a simulation start command (SSC). For example, a user associated with the simulation system 105 may input the simulation start command to the simulation system 105. Alternatively, or additionally, the user may be associated with a UE and may input the simulation start command to the UE. The user may cause the UE to provide the simulation start command to the simulation system 105, and the simulation system 105 may receive the simulation start command from the UE. The simulation start command may include a command instructing the simulation system 105 to perform multiple simulations with the network elements of the network.

As further shown in FIG. 1A, and by reference number 115, the simulation system 105 may receive status data indicating that network elements are ready to process data for multiple simulations. For example, to ensure that the network elements are ready to process the data for the multiple simulations, the simulation system 105 may receive the status data indicating that the network elements are ready to process the data for the multiple simulations. In some implementations, the simulation system 105 may provide, to the network elements, a status request (e.g., a status check) that requests acknowledgement that the network elements are ready to process the data for the multiple simulations, and may receive the status data from the network elements based on providing the status request to the network elements. In some implementations, the simulation system 105 may wait for the status data indicating that the network elements are ready to process the data for the multiple simulations before continuing with the multiple simulations, as described below.

As further shown in FIG. 1A, and by reference number 120, the simulation system 105 may align a time slot (TS), derived from a UTC, to zero. For example, the simulation system 105 may align the time slot to zero by waiting until the time slot is equal to zero. In some implementations, aligning the time slot to zero may align a portion of references utilized for the multiple simulations. For example, a first simulation execution may begin at a first time ($t_a$), a second simulation execution may begin at a second time ($t_b$), and a third simulation execution may begin at a third time ($t_c$), where the first time, the second time, and the third time are not equivalent (e.g., $t_a \neq t_b \neq t_c$). In such an example, the simulation system 105 may align the first time, the second time, and the third time to be equivalent (e.g., equal to zero, $t_a = t_b = t_c = 0$).

In some implementations, if different simulations within a same environment are executing at different times, each simulation may receive an independent network frame number (NFN) or at least an NFN aligned on SFN=0 and TS=0. If multiple simulations are executing in parallel, a first simulation may not wait since the first simulation is unaware of how many other simulations are concurrently executing (e.g., therefore, an independent NFN is utilized).

Figure 1B:
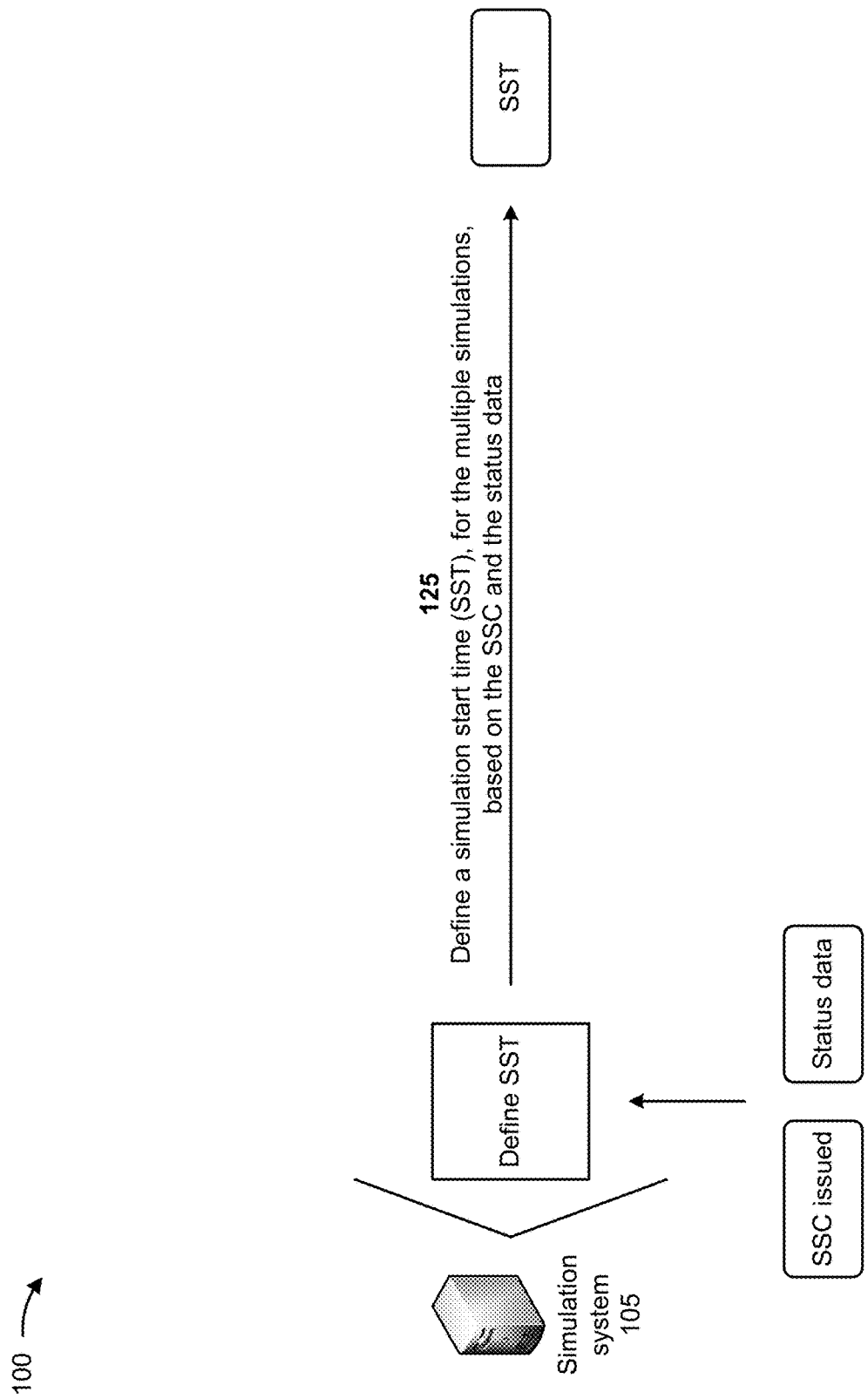

As shown in FIG. 1B, and by reference number 125, the simulation system 105 may define a simulation start time (SST), for the multiple simulations, based on the SSC and the status data. For example, the simulation system 105 may define the simulation start time to be a time after receiving the simulation start command and after receiving the status data indicating that the network elements are ready to process the data for the multiple simulations (e.g., that the network elements are ready to be configured, that state machines are ready, that data will be processed immediately, and/or the like). The simulation start time may not be fixed relative to the simulation start command due to variable natures of how much time each network element requires for startup. This may prevent alignment of activities within the multiple simulations to a known time to allow comparisons of different simulations. In some implementations, when defining the simulation start time for the multiple simulations, the simulation system 105 may determine receipt of the simulation start command, and may determine that the status data indicates that the network elements are ready to process data for the multiple simulations. The simulation system 105 may define the simulation start time based on determining the receipt of the simulation start command and determining that the status data indicates that the network elements are ready to process data for the multiple simulations.

Figure 1C:
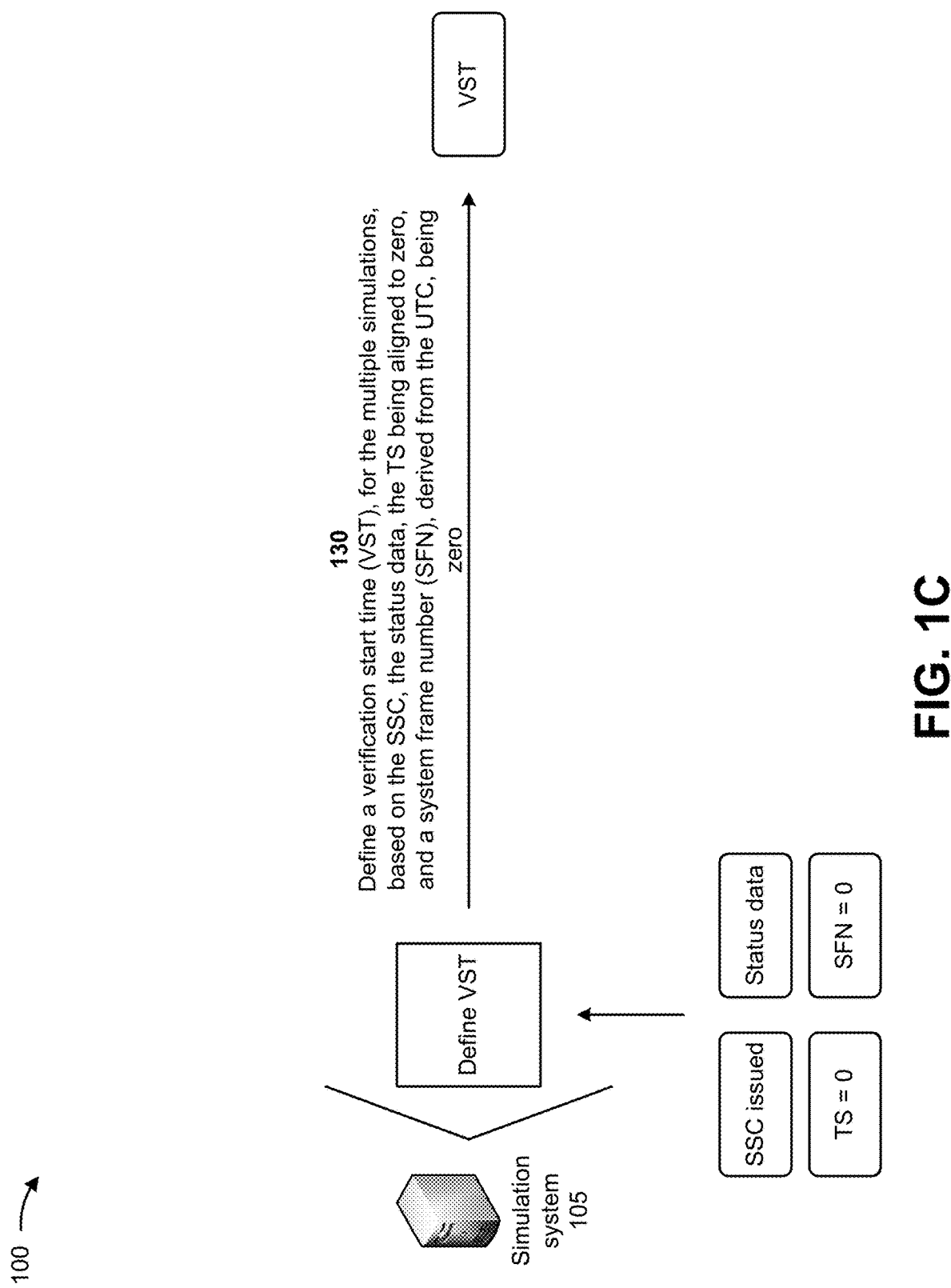

As shown in FIG. 1C, and by reference number 130, the simulation system 105 may define a verification start time (VST), for the multiple simulations, based on the SSC, the status data, the TS being aligned to zero, and a system frame number (SFN), derived from the UTC, being zero. For example, the simulation system 105 may define the verification start time to be a time after receiving the simulation start command, after receiving the status data indicating that the network elements are ready to process the data for the multiple simulations, and after the time slot and the system frame number are equivalent to zero. When the time slot and the system frame number are zero (e.g., TS=0 and SFN=0), a first simulation execution may begin at a first time ($t_a$), a second simulation execution may begin at a second time ($t_b$), and a third simulation execution may begin at a third time ($t_c$), where the first time, the second time, and the third time are equivalent (e.g., equal to zero, where $t_a = t_b = t_c$). The verification start time may ensure a common starting point for executions of the multiple simulations and an ability to compare events occurring at a same system frame number and time slot for the multiple simulations. In this way, the simulation system 105 may enable easier debugging and comparison of simulation results associated with different simulations.

In some implementations, when defining the verification start time for the multiple simulations, the simulation system 105 may determine receipt of the simulation start command, and may determine that the status data indicates that the network elements are ready to process data for the multiple simulations. The simulation system 105 may define the verification start time based on determining the receipt of the simulation start command, determining that the status data indicates that the network elements are ready to process data for the multiple simulations, the time slot being aligned to zero, and the system frame number being zero.

Figure 1D:
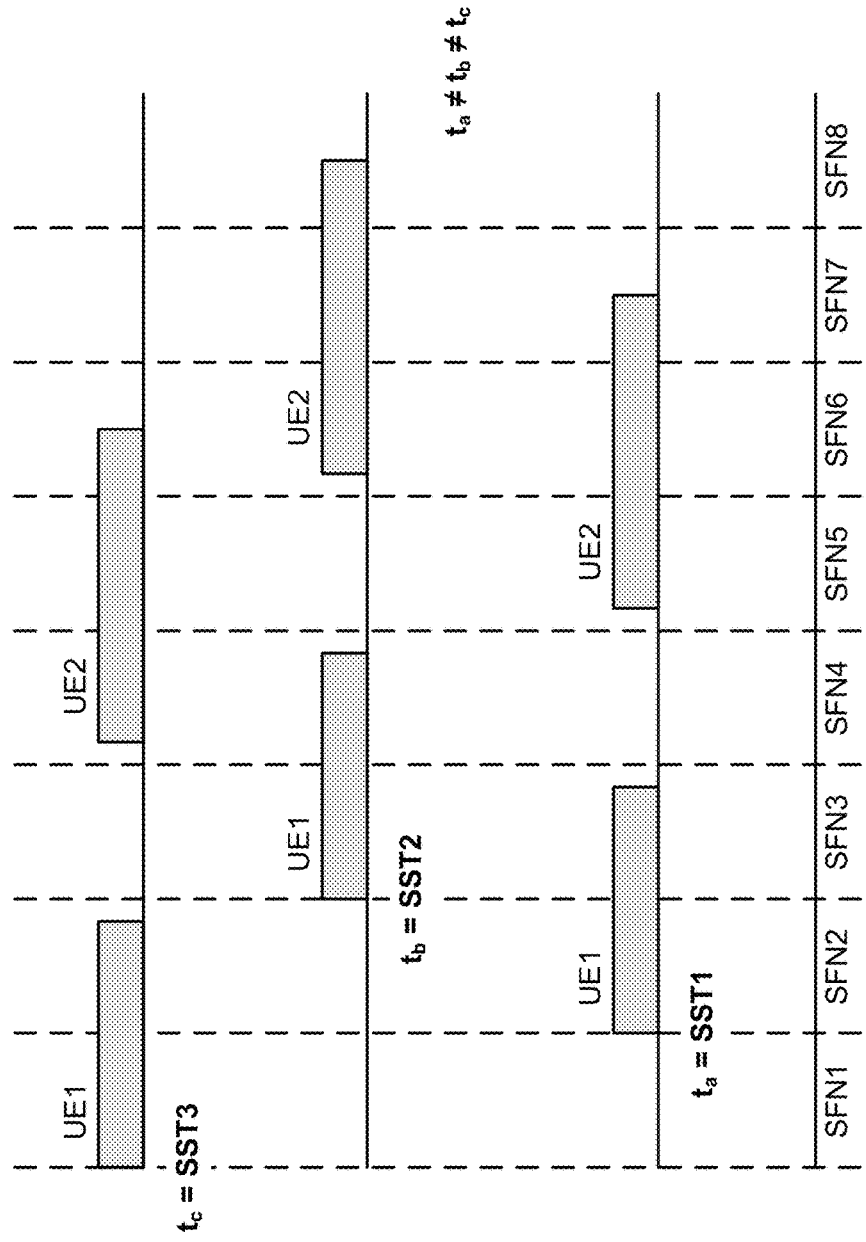

FIG. 1D depicts execution of the same simulation at different times (e.g., and without the verification start time) and the effects on a first UE (e.g., UE1) and a second UE (e.g., UE2). As shown, a first simulation execution may begin at a first time ($t_a$=SST1), a second simulation execution may begin at a second time ($t_b$=SST2), and a third simulation execution may begin at a third time ($t_c$=SST3). The first simulation execution may begin in a second system frame number (e.g., SFN2) for the first UE and in a fifth system frame number (e.g., SFN5) for the second UE. The second simulation execution may begin in a third system frame number (e.g., SFN3) for the first UE and in a sixth system frame number (e.g., SFN6) for the second UE. The third simulation execution may begin in a first system frame number (e.g., SFN1) for the first UE and in a fourth system frame number (e.g., SFN4) for the second UE. Thus, the first time, the second time, and the third time are not equivalent (e.g., $t_a \neq t_b \neq t_c$), which may prevent comparison of the simulation results from the three simulation executions.

Figure 1E:
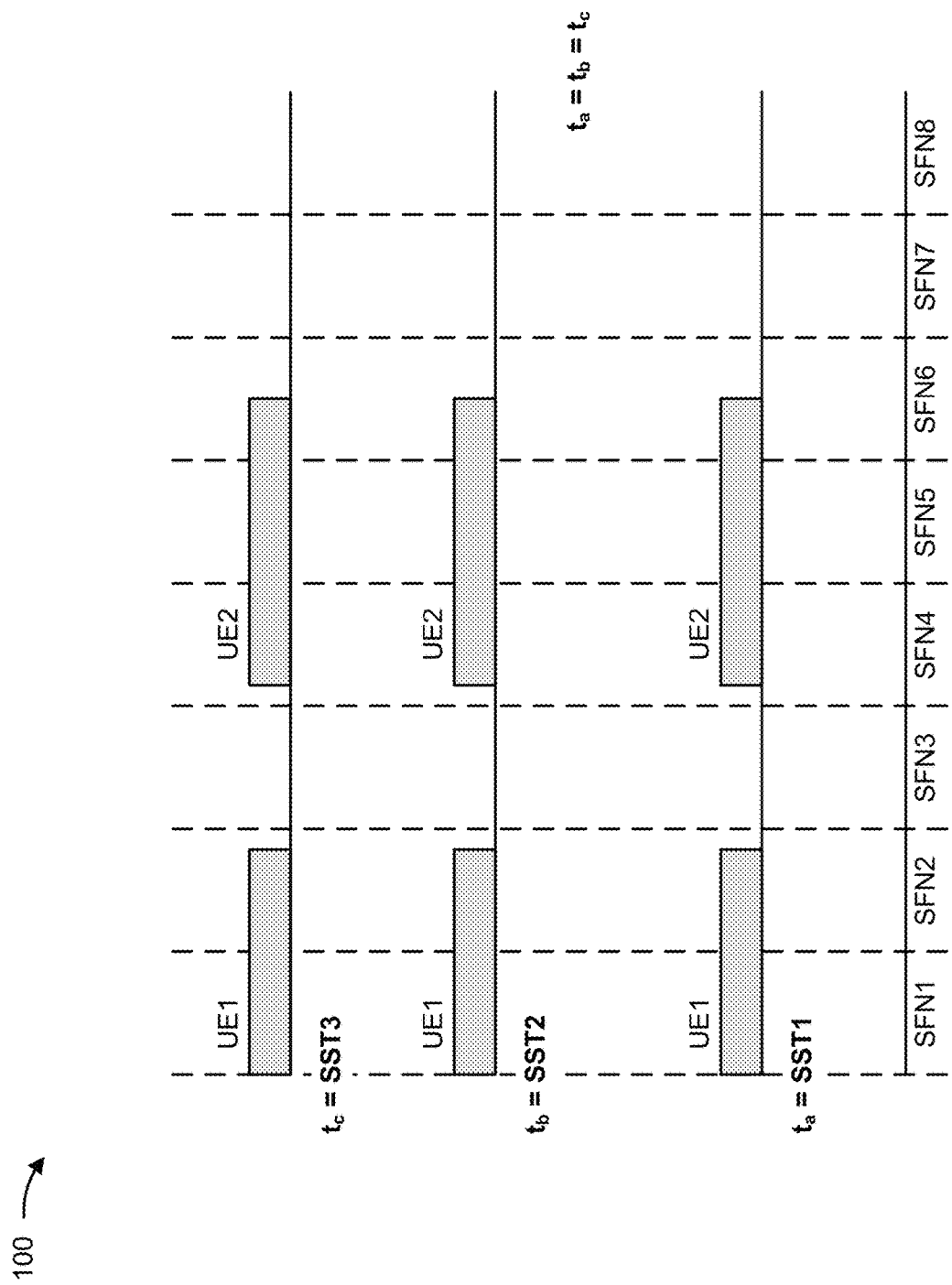

FIG. 1E depicts execution of the same simulation at different times (e.g., and with the verification start time) and the effects on the first UE and the second UE. As shown, a first simulation execution may begin at a first time ($t_a$=SST1), a second simulation execution may begin at a second time ($t_b$=SST2), and a third simulation execution may begin at a third time ($t_c$=SST3). The first, second, and third simulation executions may begin in a first system frame number (e.g., SFN1) for the first UE and in a fourth system frame number (e.g., SFN4) for the second UE. Thus, the first time, the second time, and the third time are equivalent (e.g., $t_a$=$t_b$=$t_c$), which may enable comparison of the simulation results from the three simulation executions.

Figure 1F:
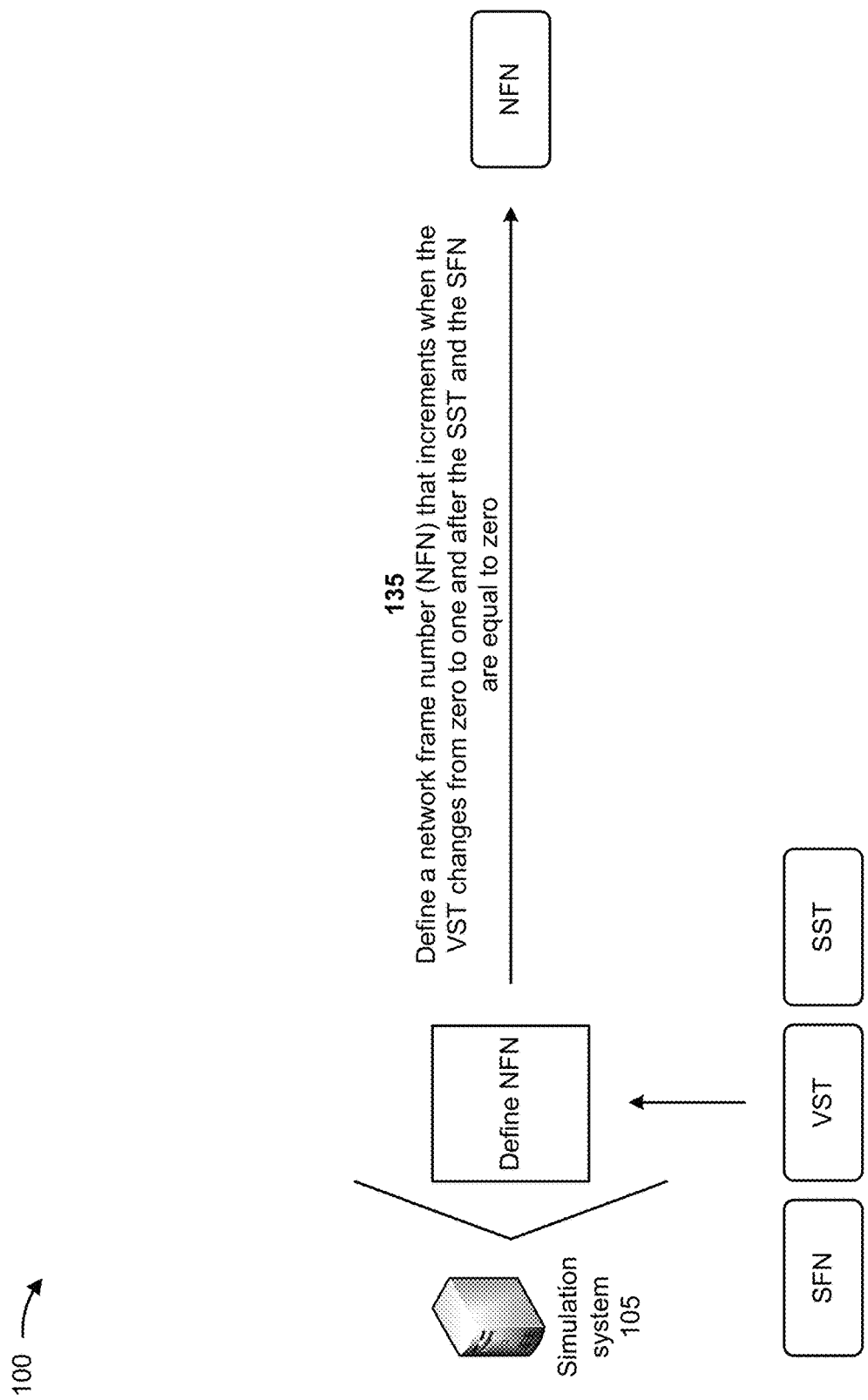

As shown in FIG. 1F, and by reference number 135, the simulation system 105 may define a network frame number (NFN) that increments when the VST changes from zero to one and after the SST and the SFN are equal to zero. For example, when each of the multiple simulations requires execution for greater than a threshold time (e.g., indicative of a long duration), the simulation system 105 may define the network frame number that increments when the verification start time changes from zero to one and after the simulation start time and the system frame number are equal to zero. In one example, if a duration of the system frame number is ten (10) milliseconds, the system frame number may repeat after every 1,024 system frame numbers (e.g., a time period of 10.24 seconds). To ensure that the network elements are applying the multiple simulations exactly at the same time, the simulation system 105 may define the network frame number that increments every 10.24 seconds (e.g., the network frame number may increment every time the system frame number moves from 1,023 to zero). The simulation system may set the network frame number to zero when the verification start time changes from zero to one and after the simulation start time and the system frame number are equal to zero. In some implementations, the network frame number may enable execution of each of the multiple simulations over a time period that is greater than a duration threshold.

Figure 1G:
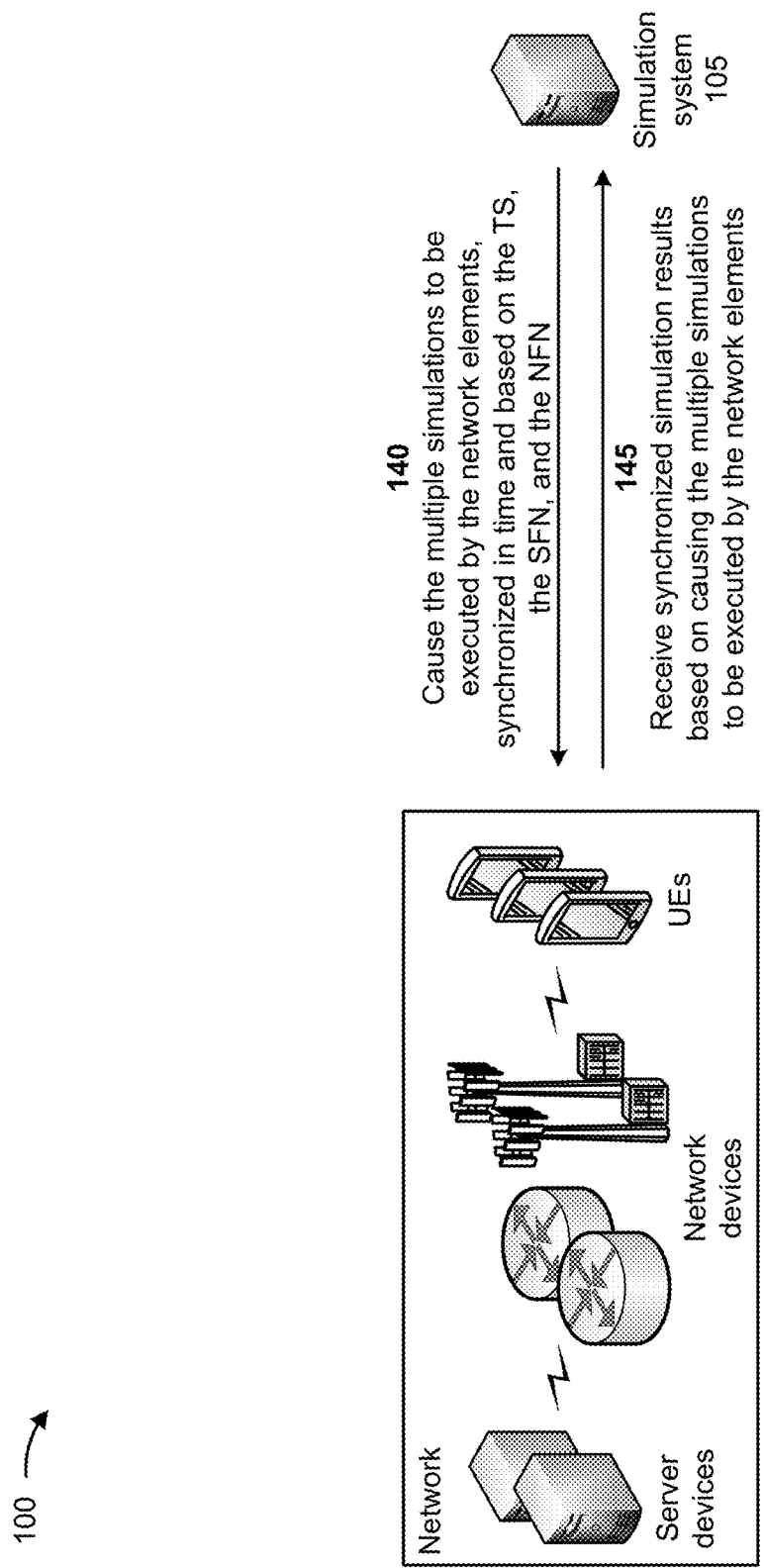

As shown in FIG. 1G, and by reference number 140, the simulation system 105 may cause the multiple simulations to be executed by the network elements, synchronized in time and based on the TS, the SFN, and the NFN. For example, the simulation system 105 may provide, to the network elements, data identifying the time slot, the system frame number, and the network frame number, and instructions to execute a simulation multiple times over a time period. The network elements may receive the data identifying the time slot, the system frame number, and the network frame number and the instructions, and may execute the simulation multiple times over the time period based on the instructions. The network elements may utilize the time slot, the system frame number, and the network frame number when executing the simulation.

As further shown in FIG. 1G, and by reference number 145, the simulation system 105 may receive synchronized simulation results based on causing the multiple simulations to be executed by the network elements. For example, the network elements may execute the simulation multiple times over the time period, and may generate the synchronized simulation results based on executing the simulation multiple times over the time period. The network elements may provide the synchronized simulation results to the simulation system 105, and the simulation system 105 may receive the synchronized simulation results.

In some implementations, the simulation system 105 may perform one or more actions based on the synchronized simulation results. For example, simulation system 105 may provide the synchronized simulation results for display to a user of the simulation system 105. The user may utilize the synchronized simulation results to compare the multiple simulations. In this way, the simulation system 105 may conserve computing resources, networking resources, and/or other resources that would have otherwise been consumed by executing the simulation multiple times and generating incomparable simulation results, attempting and failing to compare results of executing the simulation multiple times, and/or the like.

In another example, the simulation system 105 may cause one or more of the network elements to be modified based on the synchronized simulation results. The simulation system 105 may determine that a network element is not functioning properly, and may cause the network element to be modified to function properly. In this way, the simulation system 105 may conserve computing resources, networking resources, and/or other resources that would have otherwise been consumed by executing the simulation multiple times and generating incomparable simulations result, re-executing the simulation multiple times based on failing to compare the results of executing the simulation multiple times, and/or the like.

In still another example, the simulation system 105 may generate an alarm based on the synchronized simulation results. The alarm may cause a technician, a robot, an autonomous vehicle, and/or the like to be dispatched to service a network element associated with the alarm. In this way, the simulation system 105 may conserve computing resources, networking resources, and/or other resources that would have otherwise been consumed by attempting and failing to compare results of executing the simulation multiple times, re-executing the simulation multiple times based on failing to compare the results of executing the simulation multiple times, and/or the like.

Figure 1H:
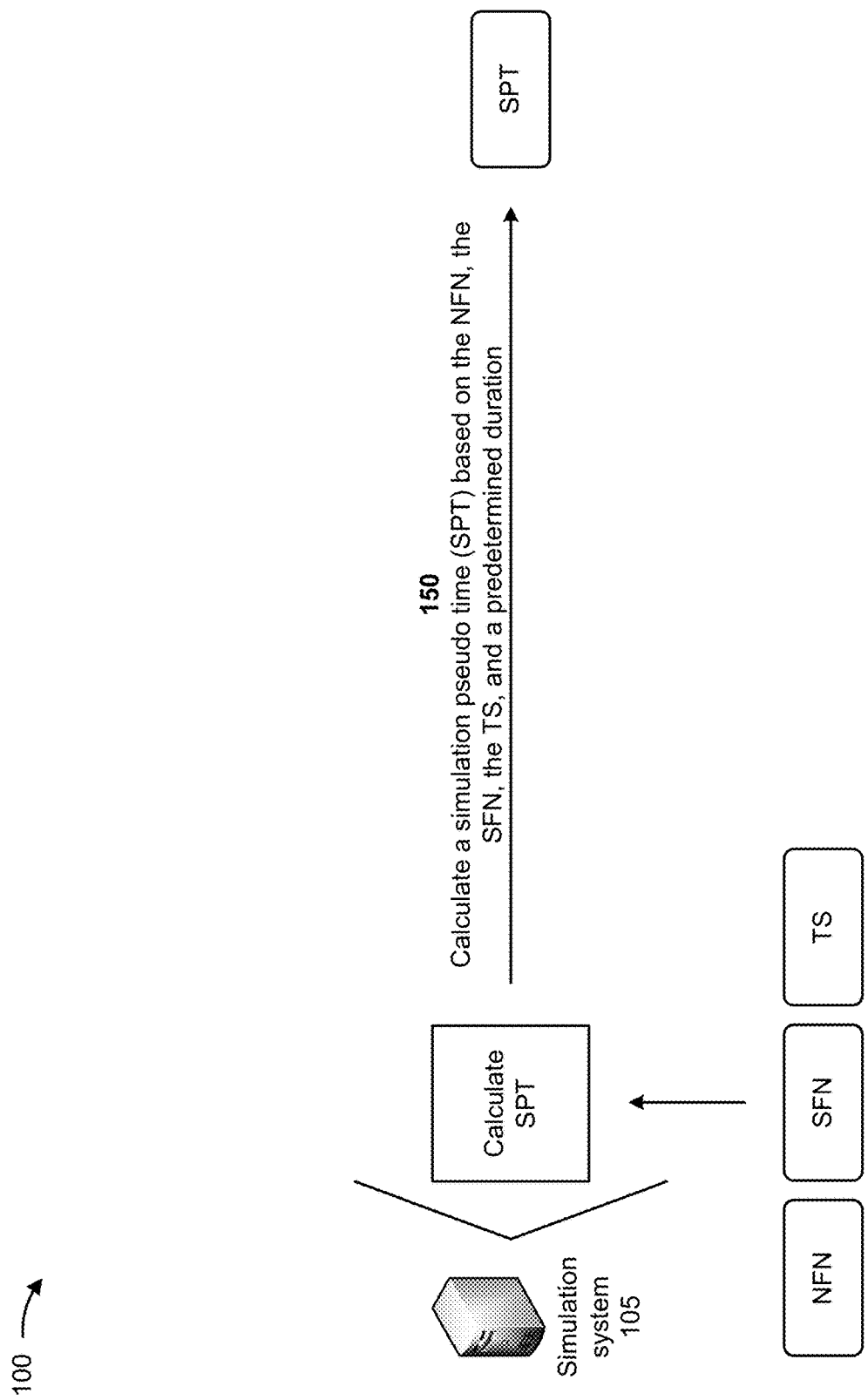

As shown in FIG. 1H, and by reference number 150, the simulation system 105 may calculate a simulation pseudo time (SPT) based on the NFN, the SFN, the TS, and a predetermined duration. For example, in order to calculate different values (e.g., radio frequency values associated with the network) within a simulation, the simulation system 105 may define a time value (e.g., the simulation pseudo time) that is expressed in seconds. In some implementations, to calculate a consistent time value, the simulation system 105 may utilize the network frame number (NFN), the system frame number (SFN), the time slot (TS), and the predetermined duration (e.g., a μ duration) to calculate the simulation pseudo time value. In some implementations, when calculating the simulation pseudo time based on the network frame number, the system frame number, the time slot, and the predetermined duration, the simulation system 105 may multiply the network frame number by a first constant to generate a first value, may multiply the system frame number by a second constant to generate a second value, may multiply the time slot by the predetermined duration to generate a third value, and may add the first value, the second value, and the third value to generate the simulation pseudo time. For example, the simulation system 105 may calculate the simulation pseudo time (SPT) according to the following formula:

$$SPT=NFN*10.24+SFN*0.01+TS*\mu,$$

where μ is zero (0) for 1.0 millisecond, one (1) for 0.5 milliseconds, two (2) for 0.25 milliseconds, three (3) for 0.125 milliseconds, and four (4) for 0.0625 milliseconds. In some implementations, a simulation time may be in seconds and may be unique throughout the simulation but may enable the network elements to utilize the exact same simulation pseudo time in any simulation. In some implementations, the predetermined duration may be based on subcarrier spacing associated with signals of the network elements.

Figure 1I:
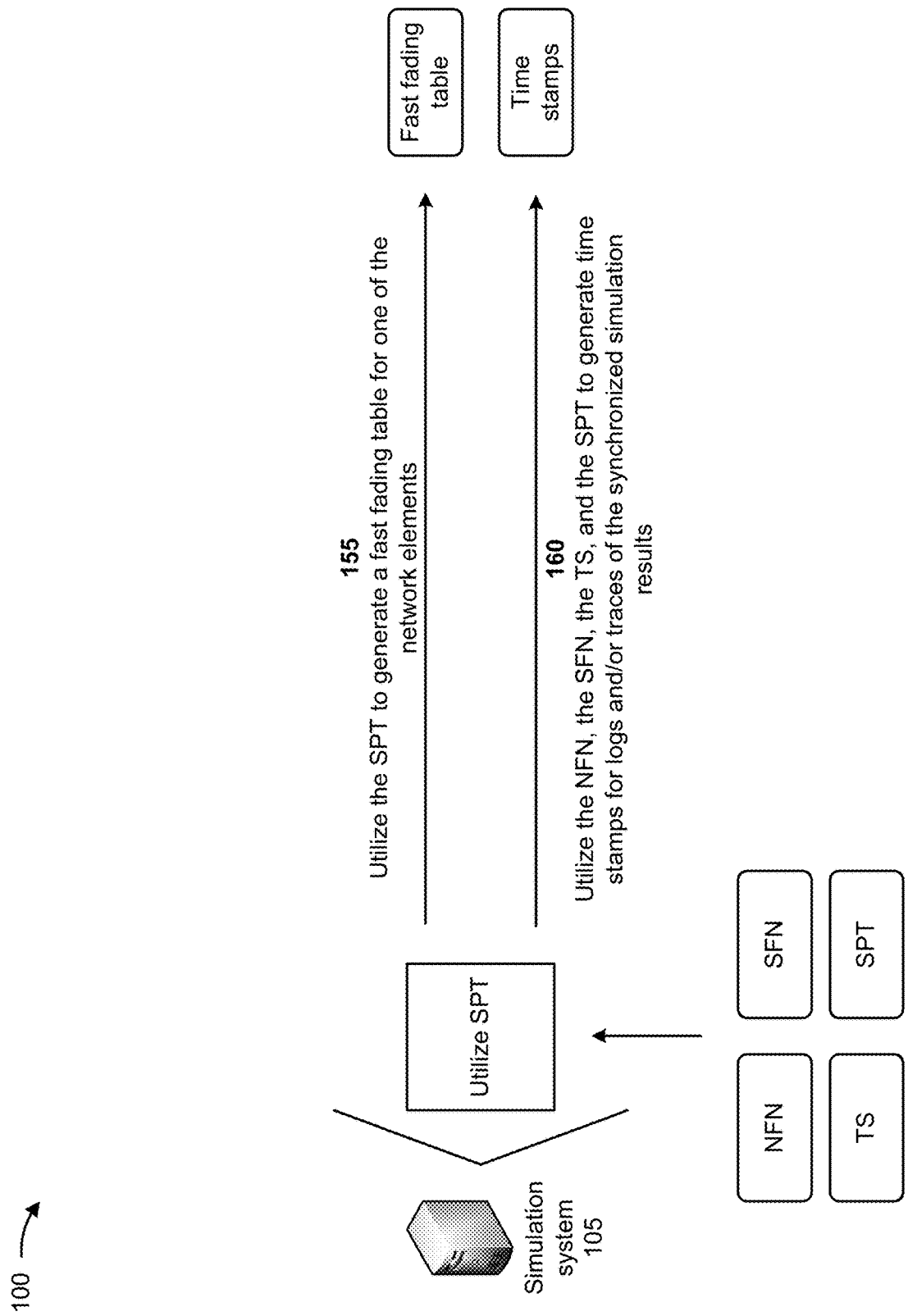

As shown in FIG. 1I, and by reference number 155, the simulation system 105 may utilize the SPT to generate a fast fading table for one of the network elements. For example, fast fading may occur in the network due to reflections from surfaces and movement of UEs within the network. A high Doppler spread may be observed in the fast fading with a Doppler bandwidth comparable to or greater than a bandwidth of a signal and channel variations may be as fast as or faster than signal variations. With the availability of the network frame number, the system frame number, and the time slot to the network elements, each network element may calculate a current time locally, accurately, and synchronized across the network. In some implementations, the simulation system 105 may utilize the simulation pseudo time to generate a fast fading table with each column representing a point in time and each row representing a specific resource block. This means that a UE and another network element (e.g., a distributed unit of a RAN) may compute the same index to the fast fading table independently (e.g., which depicts fast fading of the UE in a simulation). This may ensure a consistent simulation result even if the UE moves from one distributed unit to another distributed unit since a same index may be utilized for any distributed unit and UE. In some implementations, the simulation system 105 may provide the fast fading table for display to a user of the simulation system 105, may provide the fast fading table to the network elements, and/or the like.

As further shown in FIG. 1I, and by reference number 160, the simulation system 105 may utilize the NFN, the SFN, the TS, and the SPT to generate time stamps for logs and/or traces of the synchronized simulation results. For example, the simulation system 105 may utilize the network frame number, the system frame number, and the time slot to generate the time stamps for the logs and/or the traces of the synchronized simulation results. Alternatively, or additionally, the simulation system 105 may utilize the simulation pseudo time (e.g., a current time in milliseconds that is based on the network frame number, the system frame number, and the time slot) to generate the time stamps for the logs and/or the traces of the synchronized simulation results. In some implementations, the simulation system 105 may associate the time stamps with the logs and/or the traces of the synchronized simulation results.

Figure 1J:
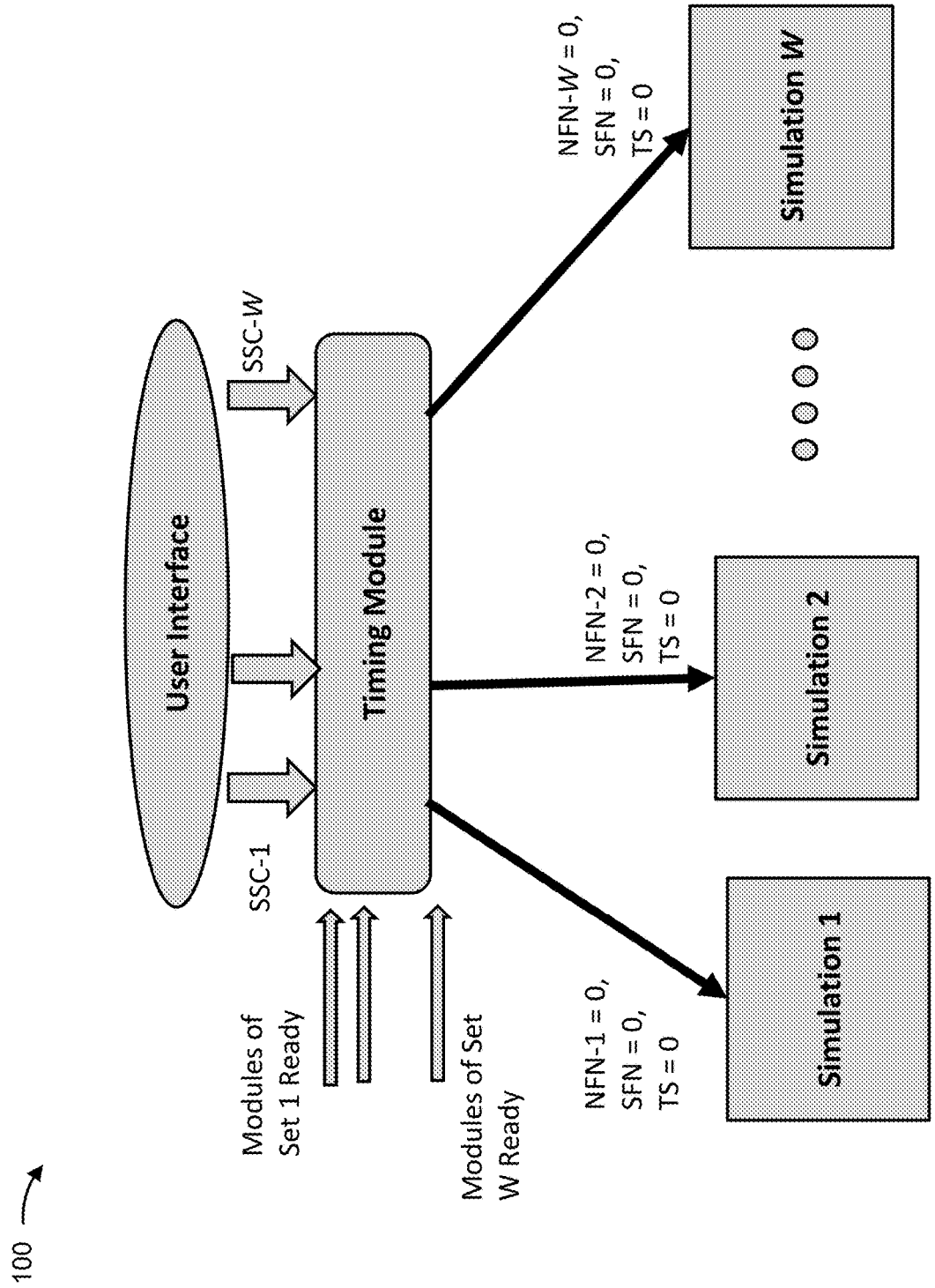

FIG. 1J depicts execution of concurrent simulations (e.g., simulation 1 through simulation W) by the simulation system 105. Each simulation may include a unique simulation identifier (e.g., a Run ID), and a timing module (e.g., of the simulation system 105) may include a list of associated network elements with each simulation identifier. The timing module may receive an SSC for each independent simulation (e.g., SSC-1 through SSC-W) along with the simulation identifier. The timing module may generate a unique NFN (e.g., NFN=1 through NFN-W) based on the SSC associated with the specific simulation identifier and the list of network elements executing the simulation. This may ensure that all concurrent simulations are, at a minimum, aligned with the SFN and the TS.

In this way, the simulation system 105 synchronizes network simulation for repeatability based on a UTC. For example, the simulation system 105 may ensure synchronization of multiple executions of a simulation regardless of when the simulation begins. This may result in the same events occurring at exactly the same relative time every time the simulation is executed. Thus, the simulation system 105 may conserve computing resources, networking resources, and/or other resources that would have otherwise been consumed by executing the simulation multiple times and generating incomparable simulation results, attempting and failing to compare results of executing the simulation multiple times, re-executing the simulation multiple times based on failing to compare the results of executing the simulation multiple times, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
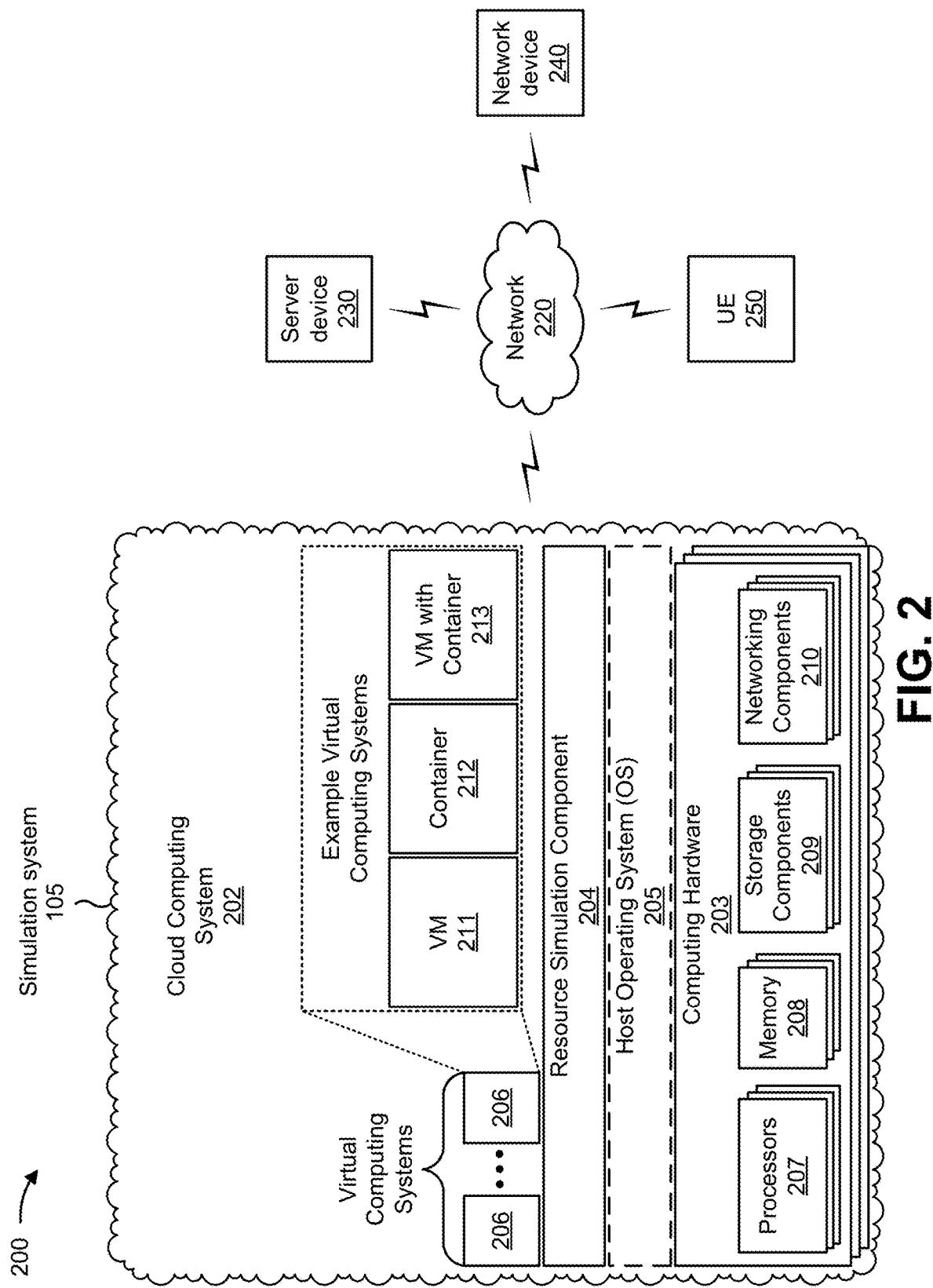
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the simulation system 105, which may include one or more elements of and/or may execute within a cloud computing system 202. The cloud computing system 202 may include one or more elements 203-213, as described in more detail below. As further shown in FIG. 2, the environment 200 may include a network 220, a server device 230, a network device 240, and/or a UE 250. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the simulation system 105 may include one or more elements 203-213 of the cloud computing system 202, may execute within the cloud computing system 202, and/or may be hosted within the cloud computing system 202, in some implementations, the simulation system 105 may not be cloud-based (e.g., may be implemented outside of a cloud computing system) or may be partially cloud-based. For example, the simulation system 105 may include one or more devices that are not part of the cloud computing system 202, such as the device 300 of FIG. 3, which may include a standalone server or another type of computing device. The simulation system 105 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The server device 230 includes one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 includes computing hardware used in a cloud computing environment.

The network device 240 includes one or more devices capable of receiving, processing, storing, routing, and/or providing traffic (e.g., a packet and/or other information or metadata) in a manner described herein. For example, the network device 240 may include a router, such as a label switching router (LSR), a label edge router (LER), an ingress router, an egress router, a provider router (e.g., a provider edge router or a provider core router), a virtual router, or another type of router. Additionally, or alternatively, the network device 240 may include a gateway, a switch, a firewall, a hub, a bridge, a reverse proxy, a server (e.g., a proxy server, a cloud server, or a data center server), a load balancer, and/or a similar device. In some implementations, the network device 240 may be a physical device implemented within a housing, such as a chassis. In some implementations, the network device 240 may be a virtual device implemented by one or more computing devices of a cloud computing environment or a data center. In some implementations, a group of network devices 240 may be a group of data center nodes that are used to route traffic flow through a network. In some implementations, the network device 240 may include a base station, such as an aggregated base station, a disaggregated base station, an integrated access and backhaul (IAB) node, a relay node, and/or one or more components thereof. The base station may refer to a central unit (CU), a distributed unit (DU), a radio unit (RU), a Near-Real Time (Near-RT) RAN Intelligent Controller (RIC), or a Non-Real Time (Non-RT) RIC, or a combination thereof.

The UE 250 includes one or more devices capable of receiving, generating, storing, processing, and/or providing information, as described elsewhere herein. The UE 250 may include a communication device and/or a computing device. For example, the UE 250 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
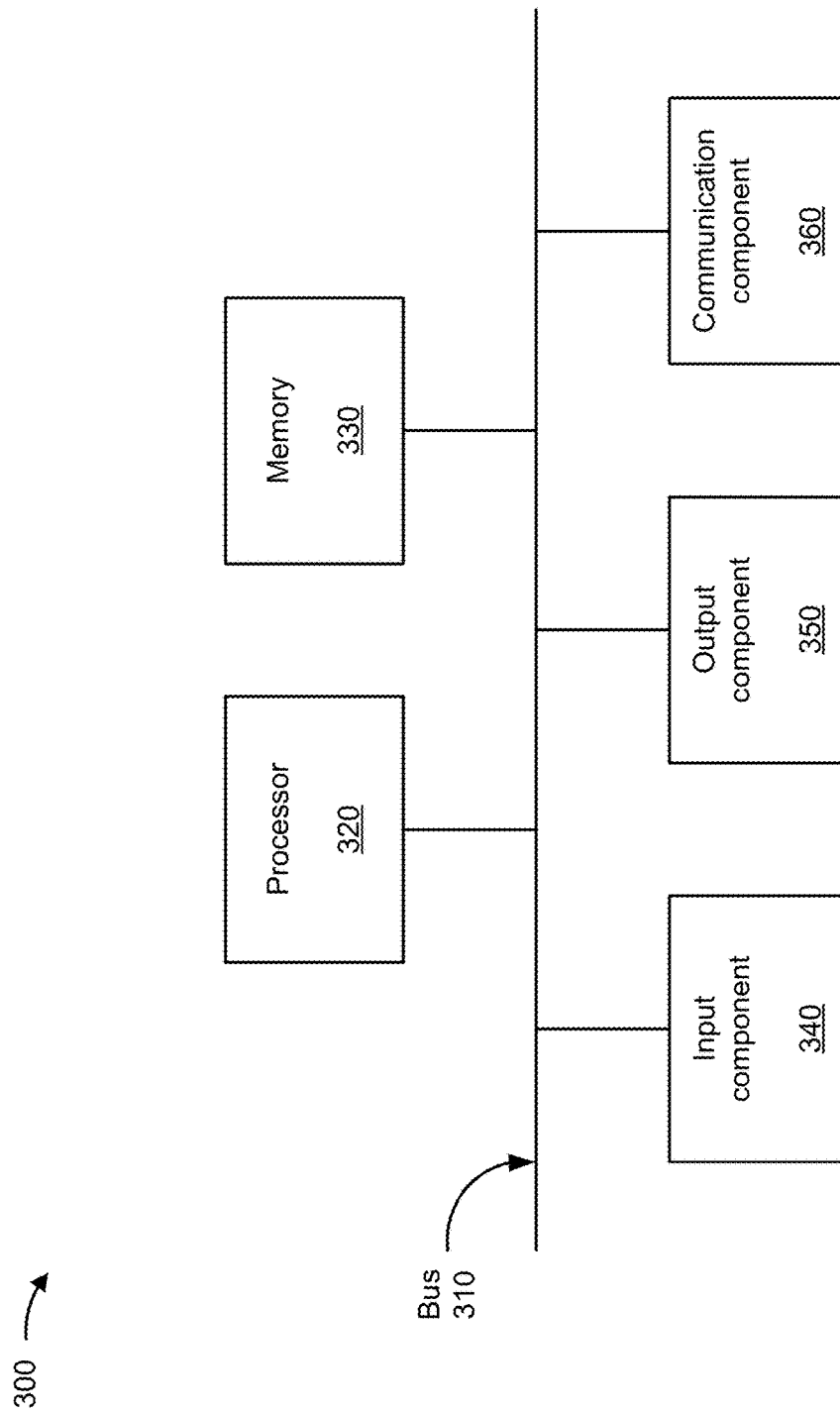
FIG. 3 is a diagram of example components of one or more devices of FIG. 2.

FIG. 3 is a diagram of example components of a device 300, which may correspond to the simulation system 105. In some implementations, the simulation system 105 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
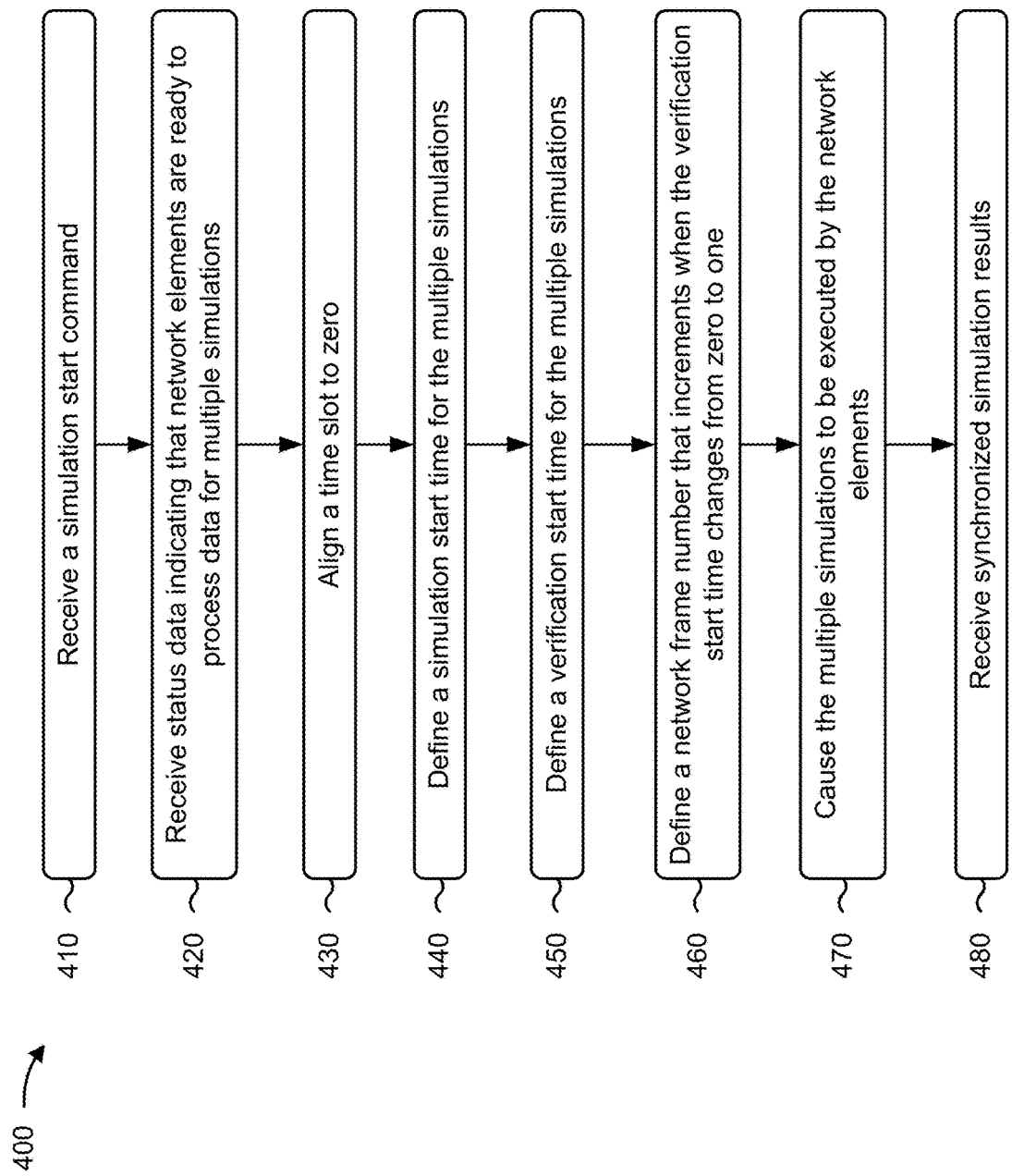
FIG. 4 is a flowchart of an example process for synchronizing network simulation for repeatability based on a UTC.

FIG. 4 depicts a flowchart of an example process 400 for synchronizing network simulation for repeatability based on a UTC. In some implementations, one or more process blocks of FIG. 4 may be performed by a device (e.g., the simulation system 105). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a simulation start command (block 410). For example, the device may receive a simulation start command, as described above.

As further shown in FIG. 4, process 400 may include receiving status data indicating that network elements are ready to process data for multiple simulations (block 420). For example, the device may receive status data indicating that network elements are ready to process data for multiple simulations, as described above. In some implementations, receiving the status data indicating that the network elements are ready to process data for the multiple simulations includes providing, to the network elements, a status request that requests acknowledgement that the network elements are ready to process data for the multiple simulations, and receiving the status data based on providing the status request to the network elements.

As further shown in FIG. 4, process 400 may include aligning a time slot to zero (block 430). For example, the device may align a time slot, derived from a UTC, to zero, as described above.

As further shown in FIG. 4, process 400 may include defining a simulation start time for the multiple simulations (block 440). For example, the device may define a simulation start time, for the multiple simulations, based on the simulation start command and the status data, as described above. In some implementations, defining the simulation start time, for the multiple simulations, based on the simulation start command and the status data includes determining receipt of the simulation start command, determining that the status data indicates that the network elements are ready to process data for the multiple simulations, and defining the simulation start time based on determining receipt of the simulation start command and determining that the status data indicates that the network elements are ready to process data for the multiple simulations.

As further shown in FIG. 4, process 400 may include defining a verification start time for the multiple simulations (block 450). For example, the device may define a verification start time, for the multiple simulations, based on the simulation start command, the status data, the time slot being aligned to zero, and a system frame number, derived from the UTC, being zero, as described above. In some implementations, defining the verification start time, for the multiple simulations, based on the simulation start command, the status data, the time slot being aligned to zero, and the system frame number being zero includes determining receipt of the simulation start command, determining that the status data indicates that the network elements are ready to process data for the multiple simulations, and defining the verification start time based on determining receipt of the simulation start command, determining that the status data indicates that the network elements are ready to process data for the multiple simulations, the time slot being aligned to zero, and the system frame number being zero. In some implementations, the verification start time enables execution of each of the multiple simulations at a common start time.

As further shown in FIG. 4, process 400 may include defining a network frame number that increments when the verification start time changes from zero to one (block 460). For example, the device may define a network frame number that increments when the verification start time changes from zero to one and after the simulation start time and the system frame number are equal to zero, as described above. In some implementations, the network frame number increments once every time the system frame number repeats. In some implementations, the network frame number enables execution of each of the multiple simulations over a time period that is greater than a duration threshold.

As further shown in FIG. 4, process 400 may include causing the multiple simulations to be executed by the network elements (block 470). For example, the device may cause the multiple simulations to be executed by the network elements, synchronized in time and based on the time slot, the system frame number, and the network frame number, as described above.

As further shown in FIG. 4, process 400 may include receiving synchronized simulation results (block 480). For example, the device may receive synchronized simulation results based on causing the multiple simulations to be executed by the network elements, as described above.

In some implementations, process 400 includes calculating a simulation pseudo time based on the network frame number, the system frame number, the time slot, and a predetermined duration. In some implementations, calculating the simulation pseudo time based on the network frame number, the system frame number, the time slot, and the predetermined duration includes multiplying the network frame number by a first constant to generate a first value, multiplying the system frame number by a second constant to generate a second value, multiplying the time slot by the predetermined duration to generate a third value, and adding the first value, the second value, and the third value to generate the simulation pseudo time. In some implementations, the predetermined duration is based on subcarrier spacing associated with signals of the network elements.

In some implementations, process 400 includes utilizing the simulation pseudo time to generate a fast fading table for one of the network elements, and providing the fast fading table for display. In some implementations, process 400 includes utilizing the network frame number, the system frame number, the time slot, and the simulation pseudo time to generate time stamps for logs or traces of the synchronized simulation results, and associating the time stamps with the logs or the traces of the synchronized simulation results.

In some implementations, process 400 includes one or more of providing the synchronized simulation results for display, causing one or more of the network elements to be modified based on the synchronized simulation results, or generating an alarm based on the synchronized simulation results.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, a simulation start command;
receiving, by the device, status data indicating that network elements are ready to process data for multiple simulations;
aligning, by the device, a time slot, derived from a universal time clock, to zero;
defining, by the device, a simulation start time, for the multiple simulations, based on the simulation start command and the status data;
defining, by the device, a verification start time, for the multiple simulations, based on the simulation start command, the status data, the time slot being aligned to zero, and a system frame number, derived from the universal time clock, being zero;
defining, by the device, a network frame number that increments when the verification start time changes from zero to one and after the simulation start time and the system frame number are equal to zero;
causing, by the device, the multiple simulations to be executed by the network elements, synchronized in time and based on the time slot, the system frame number, and the network frame number; and
receiving, by the device, synchronized simulation results based on causing the multiple simulations to be executed by the network elements.

2. The method of claim 1, further comprising:
calculating a simulation pseudo time based on the network frame number, the system frame number, the time slot, and a predetermined duration.

3. The method of claim 2, wherein calculating the simulation pseudo time based on the network frame number, the system frame number, the time slot, and the predetermined duration comprises:
multiplying the network frame number by a first constant to generate a first value;
multiplying the system frame number by a second constant to generate a second value;
multiplying the time slot by the predetermined duration to generate a third value; and
adding the first value, the second value, and the third value to generate the simulation pseudo time.

4. The method of claim 2, wherein the predetermined duration is based on subcarrier spacing associated with signals of the network elements.

5. The method of claim 2, further comprising:
utilizing the simulation pseudo time to generate a fast fading table for one of the network elements; and
providing the fast fading table for display.

6. The method of claim 2, further comprising:
utilizing the network frame number, the system frame number, the time slot, and the simulation pseudo time to generate time stamps for logs or traces of the synchronized simulation results; and
associating the time stamps with the logs or the traces of the synchronized simulation results.

7. The method of claim 1, further comprising one or more of:
providing the synchronized simulation results for display;
causing one or more of the network elements to be modified based on the synchronized simulation results; or
generating an alarm based on the synchronized simulation results.

8. A device, comprising:
one or more processors configured to:
receive a simulation start command;
receive status data indicating that network elements are ready to process data for multiple simulations;
align a time slot, derived from a universal time clock, to zero;
define a simulation start time, for the multiple simulations, based on the simulation start command and the status data;
define a verification start time, for the multiple simulations, based on the simulation start command, the status data, the time slot being aligned to zero, and a system frame number, derived from the universal time clock, being zero;
define a network frame number that increments when the verification start time changes from zero to one and after the simulation start time and the system frame number are equal to zero;
cause the multiple simulations to be executed by the network elements, synchronized in time and based on the time slot, the system frame number, and the network frame number;
receive synchronized simulation results based on causing the multiple simulations to be executed by the network elements; and
perform one or more actions based on the synchronized simulation results.

9. The device of claim 8, wherein the one or more processors, to receive the status data indicating that the network elements are ready to process data for the multiple simulations, are configured to:
provide, to the network elements, a status request that requests acknowledgement that the network elements are ready to process data for the multiple simulations; and
receive the status data based on providing the status request to the network elements.

10. The device of claim 8, wherein the one or more processors, to define the simulation start time, for the multiple simulations, based on the simulation start command and the status data, are configured to:
determine receipt of the simulation start command;
determine that the status data indicates that the network elements are ready to process data for the multiple simulations; and
define the simulation start time based on determining the receipt of the simulation start command and determining that the status data indicates that the network elements are ready to process data for the multiple simulations.

11. The device of claim 8, wherein the one or more processors, to define the verification start time, for the multiple simulations, based on the simulation start command, the status data, the time slot being aligned to zero, and the system frame number being zero, are configured to:
determine receipt of the simulation start command;
determine that the status data indicates that the network elements are ready to process data for the multiple simulations; and
define the verification start time based on determining the receipt of the simulation start command, determining that the status data indicates that the network elements are ready to process data for the multiple simulations, the time slot being aligned to zero, and the system frame number being zero.

12. The device of claim 8, wherein the network frame number increments once every time the system frame number repeats.

13. The device of claim 8, wherein the network frame number enables execution of each of the multiple simulations over a time period that is greater than a duration threshold.

14. The device of claim 8, wherein the verification start time enables execution of each of the multiple simulations at a common start time.

15. A non-transitory computer-readable medium storing a set of instructions, the set of instructions comprising:
one or more instructions that, when executed by one or more processors of a device, cause the device to:
receive a simulation start command;
receive status data indicating that network elements are ready to process data for multiple simulations;
align a time slot, derived from a universal time clock, to zero;
define a simulation start time, for the multiple simulations, based on the simulation start command and the status data;
define a verification start time, for the multiple simulations, based on the simulation start command, the status data, the time slot being aligned to zero, and a system frame number, derived from the universal time clock, being zero;
define a network frame number that increments when the verification start time changes from zero to one and after the simulation start time and the system frame number are equal to zero;
cause the multiple simulations to be executed by the network elements, synchronized in time and based on the time slot, the system frame number, and the network frame number;
receive synchronized simulation results based on causing the multiple simulations to be executed by the network elements;
calculate a simulation pseudo time based on the network frame number, the system frame number, the time slot, and a predetermined duration;
utilize the simulation pseudo time to generate a fast fading table for one of the network elements; and
provide the synchronized simulation results and the fast fading table for display.

16. The non-transitory computer-readable medium of claim 15, wherein the one or more instructions, that cause the device to calculate the simulation pseudo time based on the network frame number, the system frame number, the time slot, and the predetermined duration, cause the device to:
multiply the network frame number by a first constant to generate a first value;
multiply the system frame number by a second constant to generate a second value;
multiply the time slot by the predetermined duration to generate a third value; and
add the first value, the second value, and the third value to generate the simulation pseudo time.

17. The non-transitory computer-readable medium of claim 15, wherein the one or more instructions further cause the device to:
utilize the network frame number, the system frame number, the time slot, and the simulation pseudo time to generate time stamps for logs or traces of the synchronized simulation results; and
associate the time stamps with the logs or the traces of the synchronized simulation results.

18. The non-transitory computer-readable medium of claim 15, wherein the one or more instructions further cause the device to one or more of:
cause one or more of the network elements to be modified based on the synchronized simulation results; or
generate an alarm based on the synchronized simulation results.

19. The non-transitory computer-readable medium of claim 15, wherein the one or more instructions, that cause the device to define the simulation start time, for the multiple simulations, based on the simulation start command and the status data, cause the device to:
determine receipt of the simulation start command;
determine that the status data indicates that the network elements are ready to process data for the multiple simulations; and
define the simulation start time based on determining the receipt of the simulation start command and determining that the status data indicates that the network elements are ready to process data for the multiple simulations.

20. The non-transitory computer-readable medium of claim 15, wherein the one or more instructions, that cause the device to define the verification start time, for the multiple simulations, based on the simulation start command, the status data, the time slot being aligned to zero, and the system frame number being zero, cause the device to:
determine receipt of the simulation start command;
determine that the status data indicates that the network elements are ready to process data for the multiple simulations; and
define the verification start time based on determining the receipt of the simulation start command, determining that the status data indicates that the network elements are ready to process data for the multiple simulations, the time slot being aligned to zero, and the system frame number being zero.

* * * * *